United States Patent
Wang

(10) Patent No.: US 11,926,711 B2
(45) Date of Patent: Mar. 12, 2024

(54) TPS/PLA/PBAT BLEND MODIFIED BIODEGRADABLE RESIN PREPARED BY USING CHAIN EXTENDER AND PREPARATION METHOD THEREOF

(71) Applicant: NANJING WURUI BIODEGRADABLE NEW MATERIAL RESEARCH INSTITUTE CO., LTD., Nanjing (CN)

(72) Inventor: Tingwei Wang, Nanjing (CN)

(73) Assignee: NANJING WURUI BIODEGRADABLE NEW MATERIAL RESEARCH INSTITUTE CO., LTD., Nanjing (CN)

( * ) Notice: Subject to any disclaimer, the term of this patent is extended or adjusted under 35 U.S.C. 154(b) by 452 days.

(21) Appl. No.: 17/434,399

(22) PCT Filed: Oct. 12, 2019

(86) PCT No.: PCT/CN2019/110729
§ 371 (c)(1),
(2) Date: Aug. 26, 2021

(87) PCT Pub. No.: WO2020/083049
PCT Pub. Date: Apr. 30, 2020

(65) Prior Publication Data
US 2022/0041816 A1 Feb. 10, 2022

(30) Foreign Application Priority Data
Oct. 25, 2018 (CN) .......................... 201811250638.5

(51) Int. Cl.
| | |
|---|---|
| *C08J 3/00* | (2006.01) |
| *B29C 48/04* | (2019.01) |
| *B29C 48/255* | (2019.01) |
| *C08J 5/18* | (2006.01) |
| *C08L 67/02* | (2006.01) |

(52) U.S. Cl.
CPC ............... *C08J 3/005* (2013.01); *B29C 48/04* (2019.02); *B29C 48/2552* (2019.02); *C08J 5/18* (2013.01); *C08L 67/02* (2013.01); *C08J 2367/02* (2013.01); *C08J 2403/04* (2013.01); *C08J 2467/04* (2013.01); *C08L 2201/06* (2013.01); *C08L 2203/16* (2013.01); *C08L 2205/03* (2013.01)

(58) Field of Classification Search
CPC ................................. C08L 67/02; C08L 67/04
See application file for complete search history.

(56) References Cited

FOREIGN PATENT DOCUMENTS

| | | |
|---|---|---|
| CN | 102304276 A | 1/2012 |
| CN | 105602011 A | 5/2016 |
| CN | 106046725 A | 10/2016 |
| CN | 108192303 A * | 6/2018 |
| CN | 109504041 A | 3/2019 |
| WO | 2010138081 A1 | 12/2010 |
| WO | 2014173985 A1 | 10/2014 |

OTHER PUBLICATIONS

CN 108192303 A machine translation (Jun. 2018).*

* cited by examiner

*Primary Examiner* — Ana L. Woodward
(74) *Attorney, Agent, or Firm* — Bayramoglu Law Offices LLC

(57) ABSTRACT

A thermoplastic starch (TPS)/polylactic acid (PLA)/poly (butylene adipate-co-terephthalate) (PBAT) blend modified biodegradable resin is prepared by using a chain extender, and is prepared from the following raw materials: 20-30 parts by weight of TPS; 20-30 parts by weight of PLA; 40-60 parts by weight of PBAT; and 0.5-0.9 parts by weight of a chain extender KL-E. The preparation method is a two-step method: blending the TPS with the PBAT in a twin screw for granulating; mixing TPS/PBAT mixed granules with PLA granules, and dissolving the chain extender KL-E into an ethyl acetate solution. The chain extender KL-E can be uniformly distributed in PLA and TPS/PBAT mixed granules by using a spraying method, and the remaining short-chain molecules and terminal carboxyl molecules in the mixed granules can be changed into long-chain molecules.

4 Claims, No Drawings

TPS/PLA/PBAT BLEND MODIFIED BIODEGRADABLE RESIN PREPARED BY USING CHAIN EXTENDER AND PREPARATION METHOD THEREOF

CROSS REFERENCE TO THE RELATED APPLICATIONS

This application is the national phase entry of International Application No. PCT/CN2019/110729, filed on Oct. 12, 2019, which is based upon and claims priority to Chinese Patent Application No. 201811250638.5, filed on Oct. 25, 2018, the entire contents of which are incorporated herein by reference.

TECHNICAL FIELD

The present disclosure relates to a thermoplastic starch (TPS)/polylactic acid (PLA)/poly(butylene adipate-co-terephthalate) (PBAT) blend modified biodegradable resin prepared by using a chain extender and a preparation method thereof, and belongs to the field of biodegradable plastics.

BACKGROUND

Starch is a commonly used biodegradable material. The native starch is subjected to esterification, grafting, and other chemical modification processes to obtain a TPS resin.

PLA is a new type of bio-based and renewable biodegradable material made from starch raw materials extracted from renewable plant resources. The starch raw material is saccharified to obtain glucose, the glucose and a certain strain are fermented to produce high-purity lactic acid, and PLA with a certain molecular weight is synthesized by chemical synthesis. The PLA has excellent biodegradability, and the used PLA can be completely degraded by microorganisms in nature under certain conditions to finally produce carbon dioxide and water, which avoids polluting the environment. The PLA is a well-recognized environmentally friendly material.

PBAT is a copolymer of butylene adipate and butylene terephthalate, which has characteristics of PBA and PBT. PBAT not only has excellent ductility and elongation at break, but also excellent heat and impact resistance. In addition, PBAT has excellent biodegradability, and is one of the degradable materials which are active in current research on biodegradable plastics and have the broadest application in the market.

TPS, PLA and PBAT are all aliphatic resins, and all are biodegradable materials. However, the TPS is poorly compatible with the PLA, and the mechanical properties of the blended resin are poor so it is basically impossible to granulate and blow a film.

SUMMARY

An objective of the present disclosure is to provide a TPS/PLA/PBAT blend modified biodegradable resin prepared by using a chain extender, so as to improve the mechanical properties of resin effectively.

The objective of the present disclosure is achieved by the following technical solutions:

A TPS/PLA/PBAT blend modified biodegradable resin prepared by using a chain extender is disclosed, being prepared from the following raw materials:
  20-30 parts by weight of TPS;
  20-30 parts by weight of PLA;
  40-60 parts by weight of PBAT; and
  0.5-0.9 parts by weight of a chain extender, styrene, methyl methacrylate and glycidyl methacrylate copolymer.

The present disclosure further provides a method for preparing the above TPS/PLA/PBAT blend modified biodegradable resin by using a chain extender, including the steps of:
  step 1, adding a chain extender into an ethyl acetate solution, and stirring until dissolved, to obtain a solution;
  step 2, weighing and mixing dried TPS granules and PBAT granules, feeding mixed granules into a twin-screw extrusion granulator, extruding, air-cooling, stretching, and cold-cutting to obtain TPS/PBAT blend modified biodegradable resin granules; and
  step 3, mixing the TPS/PBAT blend modified biodegradable resin granules with PLA granules, spraying the solution obtained in step 1 on the surface of the mixed granules by a spraying method, feeding the mixed granules into the twin-screw extrusion granulator, extruding, air-cooling, stretching, and cold-cutting to obtain TPS/PLA/PBAT blend modified biodegradable resin granules.

Preferably, in step 1, the chain extender may be added into one-fold mass of the ethyl acetate solution.

Preferably, in step 2, twin-screw extrusion may be conducted at a temperature of 130-165° C., a screw speed of 300 r/min, and a granulation capacity of 250 kg/h.

Preferably, in step 3, the twin-screw extrusion may be conducted at a temperature of 140-175° C., a screw speed of 260-300 r/min, and a granulation capacity of 220-250 kg/h.

The present disclosure further provides a method for making a TPS/PLA/PBAT blend modified packaging bag prepared by using a chain extender, including the steps of:
  step 1, adding a chain extender into an ethyl acetate solution, and stirring until dissolved, to obtain a solution;
  step 2, weighing and mixing dried TPS granules and PBAT granules, feeding mixed granules into a twin-screw extrusion granulator, extruding, air-cooling, stretching, and cold-cutting to obtain TPS/PBAT blend modified biodegradable resin granules;
  step 3, mixing the TPS/PBAT blend modified biodegradable resin granules with PLA granules, spraying the solution obtained in step 1 on the surface of the mixed granules by a spraying method, feeding the mixed granules into the twin-screw extrusion granulator, extruding, air-cooling, stretching, and cold-cutting to obtain TPS/PLA/PBAT blend modified biodegradable resin granules;
  step 4, blowing the TPS/PLA/PBAT blend modified biodegradable resin granules directly into a film by a film blowing machine; and
  step 5, making a film obtained in step 4 into a packaging bag by printing and bagmaking.

Preferably, in step 1, the chain extender may be added into one-fold mass of the ethyl acetate solution.

Preferably, in step 2, twin-screw extrusion may be conducted at a temperature of 130-165° C., a screw speed of 300 r/min, and a granulation capacity of 250 kg/h.

Preferably, in step 3, the twin-screw extrusion may be conducted at a temperature of 140-175° C., a screw speed of 260-300 r/min, and a granulation capacity of 220-250 kg/h.

Preferably, in step 4, film thickness may be less than 0.10 mm.

A method for adding a chain extender is adopted in the present disclosure. The chain extender added during blending may have a modifying effect on chain extension and improve material compatibility. The preparation method is a two-step method: blending the TPS with the PBAT in a twin screw for granulating; mixing TPS/PBAT mixed granules with PLA granules, and dissolving the chain extender into an ethyl acetate solution. The chain extender may be uniformly distributed in PLA and TPS/PBAT mixed granules by using a spraying method; during the reaction, ethyl acetate is volatilized, and the chain extender is uniformly adsorbed on the surface of the granules; at a certain temperature and in the presence of a shear force of the twin screw, the chain extender may change the remaining short-chain molecules and terminal carboxyl molecules in the mixed granules into long-chain molecules in the short run (0.5-1 min). The compatibility of these two materials may be greatly improved in the chain extension process, and the hydrolytic resistance may be improved; the melting strength and mechanical properties of a blended material may be substantially improved, and the mechanical properties of the resin may be improved by 50% or above. The present disclosure only uses the chain extender as an auxiliary agent, and does not need to add any other auxiliary agent, and the modified biodegradable resin prepared is especially suitable for making a film, having superior mechanical properties.

DETAILED DESCRIPTION OF THE EMBODIMENTS

Example 1

A method for preparing a TPS/PLA/PBAT blend modified biodegradable resin by using a chain extender was provided, including the following steps:
  step 1, a chain extender, styrene, methyl methacrylate and glycidyl methacrylate copolymer (Shanxi Provincial Institute of Chemical Industry, KL-E4370) was added into one-fold mass of ethyl acetate solution, and stirred until dissolved, to obtain a solution;
  step 2, TPS granules and PBAT granules weighed and mixed, mixed granules were fed into a twin-screw extrusion granulator, extruded, air-cooled, stretched, and cold-cut to obtain TPS/PBAT blend modified biodegradable resin granules; herein, 30 parts of TPS and 70 parts of PBAT were fed; twin-screw extrusion was conducted at a temperature of 130° C., a screw speed of 300 r/min, and a granulation capacity of 250 kg/h;
  step 3, 80 parts of the TPS/PBAT blend modified biodegradable resin granules and 20 parts of PLA granules were dried and mixed; the solution obtained in step 1 was sprayed on the surface of the mixed granules; the mixed granules were fed into a twin-screw extrusion granulator, extruded, air-cooled, stretched, and cold-cut to obtain TPS/PLA/PBAT blend modified biodegradable resin granules; in step 3, the PLA was 4032D (Nature Work, USA), the twin-screw extrusion was conducted at a temperature of 140° C., a screw speed of 250 r/min, and a granulation capacity of 220 kg/h.

The properties of the TPS/PLA/PBAT blend modified biodegradable resin granules were determined as follows: melt flow rate was 0.5 g/10 min, 190° C./2.16 kg; density was 1.25 g/cm$^3$; and volatile matter was less than 0.4%.

The TPS/PLA/PBAT blend modified biodegradable resin granules were directly blown into a film by a film blowing machine. When the film thickness was 0.035 mm, the properties of the film were measured according to GB/T1040.3; the tensile strength of the film (vertical+horizontal)/2 was at 30 MPa, the elongation at break (vertical+horizontal)/2 was 250%, and the tear strength was 100 N/15 mm.

The film was made into a packaging bag by printing and bagmaking.

Example 2

A method for preparing a TPS/PLA/PBAT blend modified biodegradable resin by using a chain extender was provided, including the following steps:
  step 1, a chain extender, styrene, methyl methacrylate and glycidyl methacrylate copolymer (Shanxi Provincial Institute of Chemical Industry, KL-E4370) was added into one-fold mass of ethyl acetate solution, and stirred until dissolved, to obtain a solution;
  step 2, TPS granules and PBAT granules weighed and mixed, mixed granules were fed into a twin-screw extrusion granulator, extruded, air-cooled, stretched, and cold-cut to obtain TPS/PBAT blend modified biodegradable resin granules; herein, 40 parts of TPS and 60 parts of PBAT were fed; twin-screw extrusion was conducted at a temperature of 165° C., screw speed was 300 r/min, and granulation capacity was 250 kg/h;
  step 3, 70 parts of the TPS/PBAT blend modified biodegradable resin granules and 30 parts of PLA granules were mixed; the solution obtained in step 1 was sprayed on the surface of the mixed granules; the mixed granules were fed into a twin-screw extrusion granulator, extruded, air-cooled, stretched, and cold-cut to obtain TPS/PLA/PBAT blend modified biodegradable resin granules; in step 3, the PLA was 4032D (Nature Work, USA), the twin-screw extrusion was conducted at a temperature of 175° C., a screw speed of 280 r/min, and a granulation capacity of 230 kg/h.

The properties of the TPS/PLA/PBAT blend modified biodegradable resin granules were determined as follows: melt flow rate was 1 g/10 min, 190° C./2.16 kg; density was 1.29 g/cm$^3$; and volatile matter was less than 0.4%.

The TPS/PLA/PBAT blend modified biodegradable resin granules were directly blown into a film by a film blowing machine. The properties of the film were measured according to GB/T1040.3; the tensile strength of the film (vertical+horizontal)/2 was at 34 MPa, the elongation at break (vertical+horizontal)/2 was 220%, and the tear strength was 95 N/15 mm.

Example 3

A method for preparing a TPS/PLA/PBAT blend modified biodegradable resin by using a chain extender was provided, including the following steps:
  step 1, a chain extender styrene, methyl methacrylate and glycidyl methacrylate copolymer (Shanxi Provincial Institute of Chemical Industry, KL-E4370) was added into one-fold mass of ethyl acetate solution, and stirred until dissolved, to obtain a solution;
  step 2, TPS granules and PBAT granules weighed and mixed, mixed granules were fed into a twin-screw extrusion granulator, extruded, air-cooled, stretched, and cold-cut to obtain TPS/PBAT blend modified biodegradable resin granules; herein, 50 parts of TPS and 50 parts of PBAT were fed; twin-screw extrusion was conducted at a temperature of 145° C., screw speed was 300 r/min, and granulation capacity was 250 kg/h;

step 3, 75 parts of the TPS/PBAT blend modified biodegradable resin granules and 25 parts of PLA granules were mixed; the solution obtained in step 1 was sprayed on the surface of the mixed granules; the mixed granules were fed into a twin-screw extrusion granulator, extruded, air-cooled, stretched, and cold-cut to obtain TPS/PLA/PBAT blend modified biodegradable resin granules; in step 3, the PLA was 4032D (Nature Work, USA), the twin-screw extrusion was conducted at a temperature of 150° C., a screw speed of 260 r/min, and a granulation capacity of 225 kg/h.

The properties of the TPS/PLA/PBAT blend modified biodegradable resin granules were determined as follows: melt flow rate was 0.8 g/10 min, 190° C./2.16 kg; density was 1.29 g/cm$^3$; and volatile matter was less than 0.4%.

The TPS/PLA/PBAT blend modified biodegradable resin granules were directly blown into a film by a film blowing machine. The properties of the film were measured according to GB/T1040.3; the tensile strength of the film (vertical+horizontal)/2 was at 30 MPa, the elongation at break (vertical+horizontal)/2 was 240%, and the tear strength was 100 N/15 mm.

Comparative Example 1

A method for preparing a TPS/PLA/PBAT blend modified biodegradable resin by using a chain extender was provided, including the following steps:

step 1, a chain extender, styrene, methyl methacrylate and glycidyl methacrylate copolymer (Shanxi Provincial Institute of Chemical Industry, KL-E4370) was added into one-fold mass of ethyl acetate solution, and stirred until dissolved, to obtain a solution;

step 2, 25 parts of TPS granules, 50 parts of PBAT granules, and 25 parts of dried PLA granules were weighed and mixed; the solution obtained in step 1 was sprayed on the surface of the mixed granules; the mixed granules were fed into a twin-screw extrusion granulator, extruded, air-cooled, stretched, and cold-cut to obtain TPS/PLA/PBAT blend modified biodegradable resin granules; the twin-screw extrusion was conducted at a temperature of 165° C., a screw speed of 280 r/min, and a granulation capacity of 230 kg/h.

The TPS/PLA/PBAT blend modified biodegradable resin granules were directly blown into a film by a film blowing machine. The properties of the film were measured according to GB/T1040.3; the tensile strength of the film (vertical+horizontal)/2 was at 18 MPa, the elongation at break (vertical+horizontal)/2 was 150%, and the tear strength was 70 N/15 mm.

Comparative Example 2

Step 1, 50 parts of TPS granules and 50 parts of PBAT granules were mixed; the mixed granules were fed into a twin-screw extrusion granulator, extruded, air-cooled, stretched, and cold-cut to obtain TPS/PBAT blend modified biodegradable resin granules; the twin-screw extrusion was conducted at a temperature of 135° C., a screw speed of 300 r/min, and a granulation capacity of 250 kg/h.

Step 2, 75 parts of the TPS/PBAT blend modified biodegradable resin granules and 25 parts of PLA granules were mixed; the mixed granules were fed into a twin-screw extrusion granulator, extruded, air-cooled, stretched, and cold-cut to obtain TPS/PLA/PBAT blend modified biodegradable resin granules; the twin-screw extrusion was conducted at a temperature of 175° C., a screw speed of 280 r/min, and a granulation capacity of 230 kg/h.

The properties of the prepared TPS/PLA/PBAT blend modified biodegradable resin granules were as follows: the tensile strength of the film (vertical+horizontal)/2 was at 15 MPa, the elongation at break (vertical+horizontal)/2 was 150%, and the tear strength was 70 N/15 mm.

It is apparent from the above examples and comparative examples that the addition of a chain extender in TPS/PLA/PBAT blend has a substantial effect on properties thereof.

What is claimed is:

1. A method for preparing a thermoplastic starch/polylactic acid/poly(butylene adipate-co-terephthalate) (TPS/PLA/PBAT) blend modified biodegradable resin by using a chain extender, comprising the steps of:
    (1) adding a chain extender into an ethyl acetate solution, and stirring until the chain extender is dissolved, wherein the chain extender is styrene, methyl methacrylate and glycidyl methacrylate copolymer;
    (2) weighing and mixing TPS granules and PBAT granules, feeding the mixed TPS granules and PBAT granules into a twin-screw extrusion granulator, blending in the twin-screw extrusion granulator in a high-temperature and high-shear manner, extruding the mixed granules out of a die orifice, stretching, air-cooling, and cold-cutting to obtain TPS/PBAT blend modified biodegradable resin granules; and
    (3) mixing the TPS/PBAT blend modified biodegradable resin granules obtained in step (2) with PLA granules, spraying the solution obtained in step (1) on a surface of the mixed TPS/PBAT blend granules and PLA granules by a spraying method, feeding the sprayed, mixed TPS/PBAT blend granules and PLA granules into the twin-screw extrusion granulator, blending in the twin-screw extrusion granulator in a high-temperature and high-shear manner, extruding, stretching, and cold-cutting to obtain TPS/PLA/PBAT blend modified biodegradable resin granules.

2. The method for preparing the TPS/PLA/PBAT blend modified biodegradable resin by using the chain extender according to claim 1, wherein in step (1), the chain extender is added into one-fold mass of the ethyl acetate solution.

3. The method for preparing the TPS/PLA/PBAT blend modified biodegradable resin by using the chain extender according to claim 2, wherein in step (2), the twin-screw extrusion granulator is conducted at a temperature of 130-165° C., a screw speed of 300 r/min, and a granulation capacity of 250 kg/h.

4. The method for preparing the TPS/PLA/PBAT blend modified biodegradable resin by using the chain extender according to claim 1, wherein in step (3), the twin-screw extrusion granulator is conducted at a temperature of 140-175° C., and a screw speed of 260-300 r/min, and a granulation capacity of 220-250 kg/h.

\* \* \* \* \*